Figure 1:
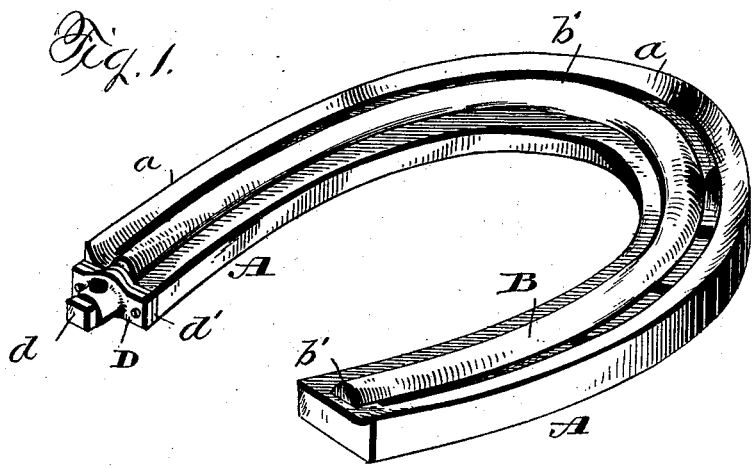

(No Model.)

H. J. WELCH.
PNEUMATIC TREAD HORSESHOE.

No. 513,662. Patented Jan. 30, 1894.

Witnesses
C. J. Williamson
E. S. Trull

Inventor
Henry J. Welch,
by Franklin H. Hough,
his Attorney.

THE NATIONAL LITHOGRAPHING COMPANY,
WASHINGTON, D. C.

UNITED STATES PATENT OFFICE.

HENRY JUSTUS WELCH, OF CARTHAGE, ASSIGNOR OF ONE-HALF TO CALVIN V. GRAVES, OF NATURAL BRIDGE, NEW YORK.

PNEUMATIC-TREAD HORSESHOE.

SPECIFICATION forming part of Letters Patent No. 513,662, dated January 30, 1894.

Application filed May 3, 1893. Serial No. 472,862. (No model.)

*To all whom it may concern:*

Be it known that I, HENRY JUSTUS WELCH, a citizen of the United States, residing at Carthage, in the county of Jefferson and State of New York, have invented certain new and useful Improvements in Horseshoes; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to certain new and useful improvements in horse-shoes, and it has for its object primarily to provide an improved horse-shoe which shall have provision for preventing the destruction of the natural cushion or spring allowed to protect the machinery of the animal while in motion. In order to do this I have provided a horse-shoe with a removable and an inflatable tube, pad or cushion; this tube is hollow and provision is made for inflating it; it is preferably thicker at a point where it comes in contact with the ground while in use. Supplemental calks are not necessary; the outer rim is so constructed as to constitute a calk.

Other objects and advantages of the invention will hereinafter appear; and the invention in this instance resides in the peculiarities of construction, and the combination, arrangement and adaptation of parts, all as more fully hereinafter described, shown in the drawings and then particularly pointed out in the claims.

The invention is clearly illustrated in the accompanying drawings, in which—

Figure 2:
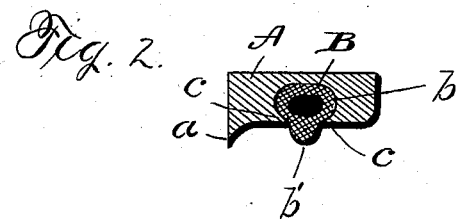
Figure 3:
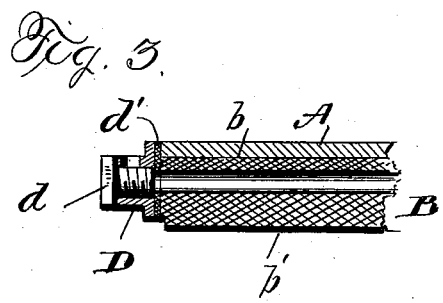

Figure 1 is a perspective view of a horse-shoe constructed in accordance with my invention. Fig. 2 is a cross section thereof. Fig. 3 is a detail of the filling tube and nut.

Like letters of reference indicate like parts throughout the several views.

Referring now to the details of the drawings by letter, A designates the shoe which is formed with a convex outer rim to form a continuous calk as seen at $a$, thus avoiding the necessity of any other calks. This calk serves in a measure to protect the tube which will soon be described. The shoe is formed with a groove $b$ which preferably extends entirely around the shoe, although it might be interrupted and two or more pieces of tube be inserted therein with an intervening space between each two pieces. This groove is undercut or dove-tail as seen in Fig. 2, the overhanging lips $c$ serving to hold the tube in place.

B is the tube, which is of rubber preferably with a thickened portion where it comes in contact with the ground, as at $b'$, the said tube having a cross section corresponding practically with the shape of the groove in the shoe as shown. The tube is inserted in the groove and filled with air in any suitable manner, for instance, after the manner in which the pneumatic tires of bicycles are inflated. The ends of the tube, one or both, may be closed in various ways; I have shown the same as being closed by a cap D screw-threaded internally between which and the end of the shoe at the heel is interposed a packing $d'$ of any suitable character. This cap is secured to the end of the shoe in any suitable manner, as by screws, as shown in Fig. 1, and is provided with a screw nut $d$. Through the orifice of the screw the air is introduced and when the tube is filled the nut is screwed up on the screw. When the tube is inflated the thickened portion is forced out beyond the bottom face of the shoe so as to contact with the ground as will be understood from Fig. 2.

Modifications in detail may be resorted to without departing from the spirit of the invention or sacrificing any of its advantages.

What I claim as new is—

1. A horse-shoe provided with an inflatable filling, as set forth.

2. A horse-shoe having an undercut groove, combined with an inflatable tube held in said groove and having means for inflating it, as set forth.

3. A horse-shoe provided with a groove, combined with a tube held in said groove and having a thickened portion, as and for the purpose specified.

4. A horse-shoe provided with a groove, combined with an inflatable tube held in said groove and having a thickened portion, a cap piece over the end of the tube, and a screw therein provided with a nut, substantially as specified.

5. A horse-shoe provided with a convex outer edge to form a calk, combined with an inflatable tube held in a groove in the shoe and having a thickened portion, substantially as specified.

In testimony whereof I affix my signature in presence of two witnesses.

HENRY JUSTUS WELCH.

Witnesses:
A. H. FRANCIS,
M. E. VAN ALLEN.